(No Model.)
L. A. DAVIS.
CORN HARVESTER.
No. 410,539. Patented Sept. 3, 1889.
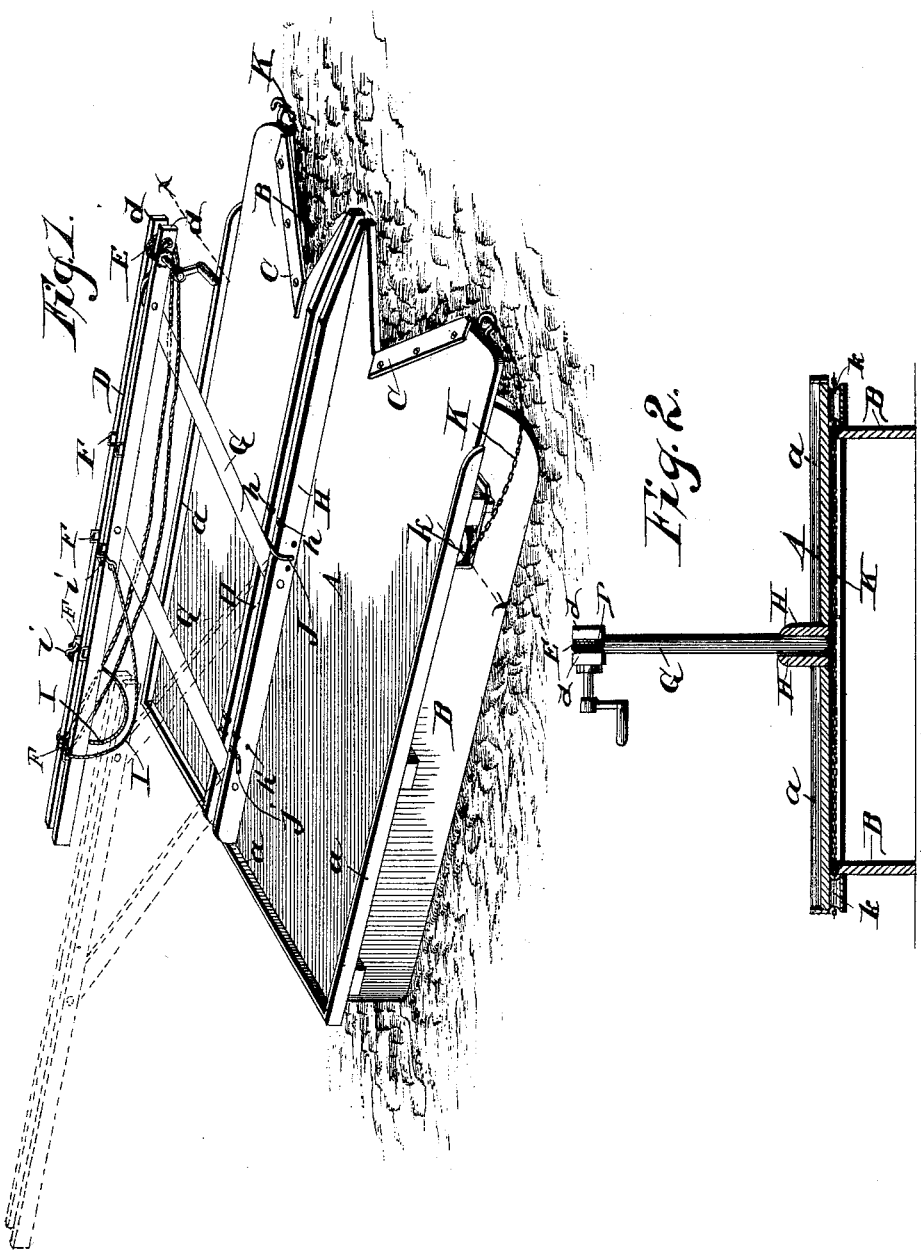
WITNESSES
Walter H. Pumphrey
Sarepta Specht
INVENTOR
Lewis A. Davis
By R.S. & A.P. Lacey
Attorneys

UNITED STATES PATENT OFFICE.

LEWIS ALBERT DAVIS, OF DELAWARE, OHIO, ASSIGNOR TO THE DELAWARE CORN HARVESTER COMPANY, OF SAME PLACE.

CORN-HARVESTER.

SPECIFICATION forming part of Letters Patent No. 410,539, dated September 3, 1889.

Application filed October 6, 1888. Serial No. 287,366. (No model.)

*To all whom it may concern:*

Be it known that I, LEWIS ALBERT DAVIS, a citizen of the United States, residing at Delaware, in the county of Delaware and State of Ohio, have invented certain new and useful Improvements in Corn-Harvesters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to corn-harvesting machines which are designed to be drawn over the field and cut the standing corn, which is caught as it is cut by a person or persons, according to the capacity of the machine, on the platform and bound to a longitudinal beam or bar that is capable of vertical and longitudinal movement. When sufficient corn is cut and gathered on the platform, the said beam or bar is shifted rearwardly and carries the corn bound thereto to the rear of the machine and deposits it on the ground where it is bound in a shock.

The improvement consists of the novel features which will hereinafter be more fully described and claimed, and shown in the annexed drawings, in which—

Figure 1 is a perspective view of a harvesting-machine, showing the longitudinal beam adjusted by dotted lines; Fig. 2, a cross-section about on the line X X of Fig. 1.

The platform A is mounted on the runners B, and is of sufficient width to extend across and operate on two rows of corn, and is provided with a rim $a$ on its sides and rear to retain the loose grain. The blades C, inclined to the draft of the machine, extend outwardly and forwardly from their inner ends, and are secured to the front end of the platform, which has V-shaped notches cut therein on each side of a median line. While only one side of these V-shaped notches is shown provided with a blade, it is evident that each side may have a blade, if desired. However, this is not deemed necessary, as good results are obtained from the construction shown.

The longitudinal beam D is, by preference, composed of two parallel bars $d\ d$, which have a series of staples F on their upper edges, and which have the windlass E journaled between their front ends. The parallel bars G, pivoted at their upper ends to the beam D between the bars $d\ d$, have their lower ends pivotally connected with the beams H, secured to and projecting up from the platform. The beams H—two being provided—are arranged at a distance apart to permit the bars G to fold between them. These bars G also fold between the bars $d\ d$ of the beam D to permit the latter to rest on the beams H. The rope I is connected at its middle to the windlass, and its ends extend along the beam D and pass through the last staples of the series F, and are provided with hooks $i\ i$, which are adapted to be engaged with the staples F and hold the corn or grain to the beam D.

The operation of the machine is as follows: The beam D, which normally rests on the beams H H, is adjusted to the required height above the platform by unfolding the bars G, and is held in the required position by interposing adjustable stops or pins between the said bars G and the beams H in one of two ways or by both. One method is to provide the beams H with a series of notches $h$ in their upper edges and fit the pin J in said notches. Another way is to provide the beams H with a series of openings $h'$ and pass the pin $j$ through such openings. The animals are hitched to the ends of the chain K, which passes across and beneath the platform and around the pulleys $k$ at the sides of the said platform. As the machine is drawn over the field, the blades C cut the corn, which is gathered by a person at each forward corner of the platform. When a sufficient quantity of grain has been cut, the team is halted and the grain placed against the beam D, the rope or cords I passed around it, and its end hooked in one of the staples. This operation is repeated until sufficient grain is gathered on the platform to form a shock, when the ends of the rope I are hooked together, and the windlass is operated to draw the rope taut and bind the grain to the beam D, which is shifted rearwardly and lifts the grain off the platform and deposits it on the ground in the rear of the machine. The grain is now bound, and the rope I loosened and detached, and the beam adjusted to the position shown by full lines in Fig. 1.

The windlass is rotated by a crank, and is held from backward movement by the usual ratchet and pawl.

Having thus described my invention, what I claim, and desire to secure by Letters Patent, is—

1. In a corn-harvester, the combination of the platform, the vertically and longitudinally movable beam D, and connections, as the bars G, between the beam and platform, and having pivotal connections at their ends with the said beam and platform, respectively, substantially as described, for the purpose specified.

2. In a corn-harvester, the combination, with the platform and the beam D, of the bars G, pivoted to beam D at their upper ends and to the platform at their lower ends, and an adjustable stop for the bars, substantially as and for the purpose described.

3. In a corn-harvester, the combination, with the platform and the beam H, of the beam D and the bars G, pivotally connecting the beam D with the beams H and adapted to fold between the beams H, substantially as set forth.

4. In a corn-harvester, the combination, with the platform, the beam D, and the bars G, pivotally connecting beam D with the platform, of the staples F on the beam, the rope I, adapted to be hooked into said staples, and the windlass mounted on the end of the beam, the rope being connected therewith, substantially as and for the purpose described.

5. The herein-described corn-harvester, composed of the platform mounted on runners, the parallel beams H, arranged midway of the sides of the platform, the beam D, composed of two parallel bars, the bars G, pivotally connecting beam D with the beams H and adapted to fold in each, the windlass on the front end of the beam, the rope I, attached therewith and having hooks at its ends, the staples F along on the beam D, adapted to be engaged by said hooks, the pins adapted to be interposed between the beams H and the bars G, the blades C on the platform, and the draft-chain extending from one side of the platform to the other and passing over pulleys at each side of the platform, substantially as described.

In testimony whereof I affix my signature in presence of two witnesses.

LEWIS ALBERT DAVIS.

Witnesses:
R. L. McCABE,
E. R. RYAN.